United States Patent

Rayburn

[15] 3,641,640

[45] Feb. 15, 1972

[54] METHOD OF MAKING METALLIZED CAPACITORS

[72] Inventor: Charles C. Rayburn, Falls Church, Va.

[73] Assignee: Illinois Tool Works Inc., Chicago, Ill.

[22] Filed: Oct. 14, 1969

[21] Appl. No.: 866,213

[52] U.S. Cl. ............................29/25.42, 242/56.1, 317/260
[51] Int. Cl. ..................................................H01g 13/00
[58] Field of Search................29/25.42; 317/260; 156/184, 156/191, 192, 193; 242/56.1

[56] References Cited

UNITED STATES PATENTS

| | | | |
|---|---|---|---|
| 2,920,834 | 1/1960 | Robinson | 242/56.1 |
| 2,930,109 | 3/1960 | Robinson et al. | 29/25.42 |
| 2,950,070 | 8/1960 | Thorson et al. | 242/56.1 |
| 3,073,008 | 1/1963 | McGraw | 29/25.42 |
| 3,229,174 | 1/1966 | Marchewka | 317/260 |

Primary Examiner—Charlie T. Moon
Assistant Examiner—Carl E. Hall
Attorney—Robert W. Beart, Michael Kovac, Barry L. Clark and Jack R. Halvorsen

[57] ABSTRACT

Method of making a plurality of identical wound metallized capacitors from a strip of dielectric material which is metallized in a plurality of overlapping areas on both sides. The metallized dielectric strip has a plurality of clear or demetallized zones along its length which overlap each other. The method steps comprise: winding a portion of the strip containing a metallized area and a cleared zone into a capacitor; and simultaneously cutting the strips in the cleared zone and heat sealing the outer wraps of cleared dielectric to the underlying wraps of the capacitor. The metallized dielectric strip may be either wound together with a plain dielectric strip or may be wound without the need for a plain dielectric strip by winding it about an axis which generally coincides with a transverse line through the center of the metallized area. A photoelectric cell may be used to sense the presence of a clear area to initiate the cutting and sealing operation.

7 Claims, 4 Drawing Figures

PATENTED FEB 15 1972 3,641,640

INVENTOR.
Charles C. Rayburn
BY Barry L. Clark
Robert W. Beart
His Att'ys

3,641,640

METHOD OF MAKING METALLIZED CAPACITORS

BACKGROUND OF THE INVENTION

1. Field of the Invention

This invention relates to capacitors and particularly to a method for producing a plurality of capacitors of identical value from an elongated strip of dielectric material which is partially metallized on each of its sides.

2. Description of the Prior Art

In U. S. Pat. No. 2,950,070 a capacitor winder is shown which winds a plurality of foil and dielectric tapes into a capacitor. The device disclosed in the patent severs the foils prior to the completion of the winding operation and then seals and severs the dielectric tape by means of a heated member. The capacitors produced by the winding machine shown in the aforementioned patent are produced at a relatively fast rate and at low cost since the heat sealing of the dielectric tape material to itself is far less expensive than using a separate piece of adhesive tape placed over the outside wraps of the capacitors. However, when winding separate foils there is a possibility that the capacitance of one capacitor compared to another of the same length will not be exactly the same due to variations caused by inherent weaving of the foil materials as they are wound into the capacitor. This weaving causes a variation in the amount of overlapped foil material and thus has a direct effect on the capacitance of the capacitor produced. The problem is most acute where the degree of foil overlap is quite small, such as 0.125 in. Furthermore, since the machine brings together at least two strips of foil and two layers of dielectric, it is more complex than a machine which need wind only one or two layers of material, especially since the foil material must be carefully measured and cut at the appropriate time prior to the cutting and sealing of the dielectric tapes.

The use of a dielectric which is metallized on two sides to produce a capacitor is disclosed in British patent 19,451 of 1900 in the name of George Mansbridge. Furthermore, two-side metallized film has been used extensively since then as exemplified by U.S. Pat. Nos. 2,651,100, 2,861,231, and 2,920,834, for example. In U.S. Pat. No. 2,861,231, capacitors are wound from a metallized dielectric sheet wherein a plurality of metallized coatings on each side of the sheet are arranged in a pattern and spaced from each other in a progressively increasing manner so as to prevent shorting when the sheet is wound up on itself without an intermediate sheet of plain dielectric.

SUMMARY

It is an object of this invention to provide a method by which capacitors, and especially low value capacitors may be produced to extremely close value tolerances.

It is another object of this invention to provide a method by which capacitors may be produced very economically.

These objects are attained by the method of the present invention wherein a dielectric tape is either selectively metallized on each of its sides so as to produce a plurality of equal alternating metallized and clear areas or else is completely metallized and then demetallized so as to achieve the desired pattern. Since techniques for metallization and demetallization are so well known in the art, no detailed description of such techniques will be given herein.

In the process of the present invention the two-side metallized dielectric material is supplied to the winding apparatus in reels wherein overlapping metallized areas of predetermined length and width are coated, such as by vapor deposition, on each side of the dielectric strip. In order to permit leads to be attached to the ends of the capacitor after winding, the metallized areas do not extend completely across the dielectric strip, but rather, only to a line spaced inwardly from one edge of the strip. Naturally, the demetallized margins for the respective sides of the capacitor are on opposite edges of the dielectric strip. Depending on the value which the finished capacitor is to have, the metallic coatings may be made to extend for any predetermined distance along the length of the dielectric strip. The dielectric strip will include demetallized or cleared zones between any two adjacent metallized areas. The necessary length of the cleared zones will be determined by the size of the finished capacitor, the thickness of the dielectric material, and the fact of whether or not the dielectric material is to constitute the finished case for the capacitor or whether it is to be encapsulated in other material such as epoxy. If the capacitor is to be self-encased, then the outer wraps of dielectric material should have a total thickness of approximately 0.005 inch. If dielectric material of a thickness of 0.0005 inch is used, then 10 layers of this material would be needed in the protective wraps on the capacitor. If the capacitor is to be encapsulated in additional material, then it is merely sufficient that the outer protective wraps be of sufficient number to permit of their being heat sealed without damaging the metallic coatings. Where the capacitor is wound with a companion plain dielectric strip from one of its ends around a mandrel, additional clear material must be provided to permit sufficient material at the leading end of the capacitor to prevent shorting of the electrodes. Where the metallized dielectric is to be folded and wound about its center without a companion dielectric strip, the cleared dielectric need only be sufficiently long to provide the necessary protective wraps and to permit heat sealing.

Regardless of whether the metallized dielectric strip is to be wound from one end together with a plain dielectric strip or wound alone from its center, it is wound until the metallized material is completely wound into the capacitor and covered by the required number of protective wraps after which the strip(s) is cut and sealed by a heated barlike member and the winding of a new capacitor commenced. The apparatus for winding can be automated by providing it with a sensing element such as a photocell which may be placed so as to receive light passing through the cleared zones on the dielectric strip. Once a cleared zone is sensed by the photocell, the controls for the apparatus may cause the winding mandrel to decelerate until the photocell senses the end of the cleared zone at which point the winder will stop and the cutting and sealing head will engage the capacitor to seal the outer wraps and cut the capacitor away from the dielectric strip(s) which is then used in the winding of the succeeding capacitor to be made.

The foregoing and other objects, features and advantages will be apparent from the following more particular descriptions of various embodiments thereof as illustrated in the accompanying drawings.

DESCRIPTION OF THE PREFERRED EMBODIMENT

Figure 1:
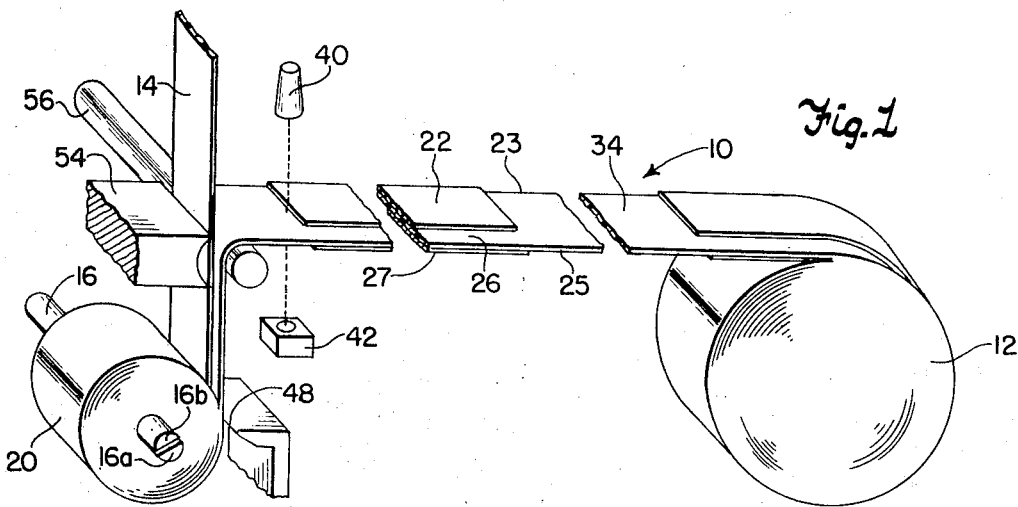
FIG. 1 is a perspective semidiagrammatic showing of apparatus usable with the process of the invention for winding a two-side metallized dielectric strip together with a companion strip of plain dielectric.

In FIG. 1 can be seen a semidiagrammatic representation of an apparatus suitable for practicing the invention. An elongated strip of metallized dielectric material 10 is unreeled from a supply reel 12 and wound with a companion plain dielectric strip 14 about a winding mandrel 16 having selectively retractable sections 16a, 16b which engage the material 10, 14 during the winding operation and are sequentially retracted to permit the finished capacitor 20 to fall free after the winding operation.

The metallized dielectric strip 10 has a plurality of metallized areas 22 of equal length equally spaced along its entire length. The metallized area 22 on one side of the strip extends from one edge of the strip 23 to a line 24 spaced inwardly from the opposite edge 25 of the strip 10 so as to define a demetallized margin area 26. On the opposite side of the dielectric strip 10 a similar metallized coating 27 is placed which corresponds in length to the metallized area 22 which it overlaps. The metallized area 27 extends from edge 25 of the strip 10 to a line 28 which is spaced from the side edge of the strip 23 so as to define a demetallized margin area 29. The margin areas 26 and 29 are provided to permit leads to be attached to the capacitor. The plain dielectric strip 14 is preferably of less width than the dielectric strip 10 and centered with respect to it so as not to interfere with the attachment of leads to the capacitor and to permit a metal spray applied to the leads and the ends of the capacitors to contact the exposed metallized areas.

Each metallized area 22 and its corresponding overlapping metallized area 27 is spaced from succeeding metallized areas 22, 27 by a demetallized or cleared zone 34. The cleared zone 34 includes a first section 34a (FIG. 2) which provides material for the protective wraps on the outside of the capacitor 20 and a second section 34b which provides insulation against shorting together of the metallized areas or electrodes 22 and 27 at the commencement of winding of a succeeding capacitor.

In order to permit winding of capacitors to take place automatically, a sensing device such as a light source 40 and a photocell 42 may be placed on opposite sides of the dielectric strip 10. Although no light can pass through the dielectric strip in the metallized regions 22, 27, the clear areas 34 will permit light from source 40 to pass through the strip 10 and fall on photocell 42 to initiate the final portion of the winding cycle for the capacitor. For example, as soon as the photocell 42 detects a cleared zone 34, it may signal the mandrel driving circuit (not shown) to decelerate the winding. Then, when the photocell detects the end of the cleared zone 34 it causes the mandrel to stop and a heated cutting bar 48 to move inwardly against the outer surface of the capacitor to seal the outer wraps and cut the capacitor 20 from the dielectric strips 10 and 14. Simultaneously with the actuation of the cutter member 48, a gathering pin follower 54 will move toward the gathering pin 56 to capture the loose ends of the dielectric strips 10 and 14. After the capacitor 20 is cut from the strips 10, 14, it is ejected from the mandrel by withdrawing the mandrel sections 16a and 16b sequentially. One of the mandrel halves 16a is then returned to its normal winding position while the gathering pin 56 and gathering pin follower 54 orbit around the mandrel section 16a to lay the strips 10, 14 on its flat surface. The second mandrel section 16b is then moved to its winding position so as to capture the strips 10, 14 after which time the gathering pin follower 54 is retracted from contact with the strips 10, 14 and the follower 54 and the gathering pin 56 return to their position shown in FIG. 1. A new winding cycle is then commenced. By properly positioning the light 40 and photocell 42 the strip 10 can be stopped in such a position that the cleared zone 34 will be cut on the line a—a (FIG. 2) so as to provide the desired amount of material in sections 34a and 34b which respectively comprise the end of one capacitor and the beginning of the next one.

Figure 2:
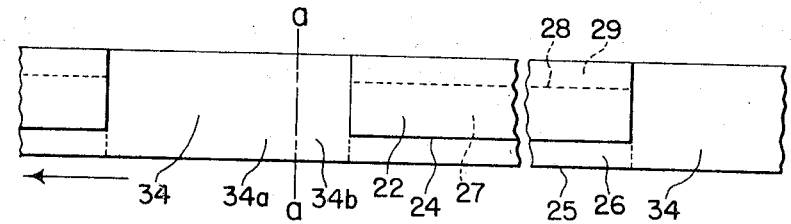
FIG. 2 is a top plan view of a portion of a length of metallized dielectric strip material utilizable with the present invention.

FIG. 2 is a top plan view of the dielectric strip 10 showing the relationship of the metallized areas 22, 27 to each other and to the cleared area 34. The dotted line a—a indicates the line on which the cleared area 34 is cut by the heated cutting and sealing bar 48. The overlapping areas of metallized zones 22, 24 are very precisely controlled and made constant along the length of the strips 10 in its initial preparation wherein the strip is either selectively metallized on both sides or completely metallized and then selectively demetallized. The constant electric field width which can be produced in two side metallized dielectrics cannot be attained practically with either one side metallized construction or with film foil construction due to inherent weave.

Although not part of the present invention, it might be noted that precise value control in the initial manufacture of the strip capacitor 10 may be obtained by a rotary pulse generator (not shown) which is driven by the strip and which operates an electronic counter (not shown). By the use of such equipment, length definition to one part in ten thousand may be obtained. After demetallizing both sides of the strip capacitor 10 to provide the clear zone 34, the strip capacitor just isolated may be sampled and data fed back to alter the electronic length count to establish and maintain an exact capacitance value from each metallized section to the next. Small shifts in the capacitance value of the wound capacitor 20 made from strip 10 can be accomplished by selecting the plain companion dielectric 14 of a slightly plus or minus gauge variance. Large shifts in the wound capacitance value can be accomplished by selecting the plain companion dielectric 14 of much greater thickness of lower dielectric constant for lower capacitance values or of less thickness or higher dielectric constant for higher values. Mixing dielectric types is easier with two-side metallized construction since the lead assembly process, spraying process, metallizing process and demetallizing process are only dependent on the properties of the one metallized member. This, for example, permits the use of a low temperature, high quality dielectric such as polystyrene, in a metallized construction wherein metallized polyester provides the mechanical characteristics of the system while the dissipation factor and temperature coefficient of capacitance are improved by the electrical mix. Where very low capacitance values are desired, they may be precisely attained by using a thick gauge, narrow width polyester for the electrode carrier and a thick narrow polypropylene film for the plain member, the polypropylene being lower in cost and dielectric constant than the polyester.

Figure 3:
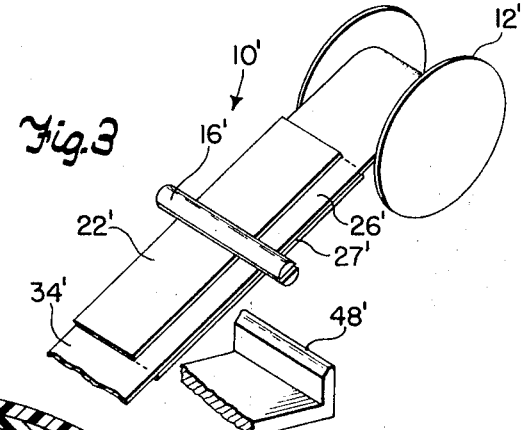
FIG. 3 is a perspective semidiagrammatic showing of apparatus for winding a capacitor from a single two-side metallized dielectric strip.

FIG. 3 shows an alternate embodiment of my invention which eliminates the necessity for a companion plain dielectric strip to be wound along with the metallized strip as in the embodiment of FIG. 1. In FIG. 3 the dielectric strip 10' is pulled from the supply reel 12' until it is in engagement with one section of the mandrel 16'. The remaining section of the mandrel is then brought over the dielectric strip to capture it and the winding of the capacitor is commenced. At the completion of the winding operation, a photocell (not shown) can be used as described in connection with FIG. 1 to decelerate the winding of the mandrel and then stop it while the heated cutting and sealing bar 48' is brought into engagement with the capacitor. With this type of construction wherein the metallized material is doubled back on itself, a very compact capacitor can be obtained since there is no need for a companion dielectric strip such as the strip 14 in FIG. 1. However, by eliminating the extra dielectric strip, one loses the ability to make changes in the value of the capacitance of the capacitors which can be made from the dielectric strip 10'. It should be noted that in the FIG. 3 construction, the cleared zone 34' should be cut in its center if it is desired to have the outer wraps made up of equal length of dielectric material. It is not however necessary that the lengths be equal, and in fact, it may even be desirable for the portion of the cleared zone 34' which ends up on the outside of the capacitor to be longer than the opposite end so as to make it possible to heat seal through only one outer layer rather than two.

Figure 4:
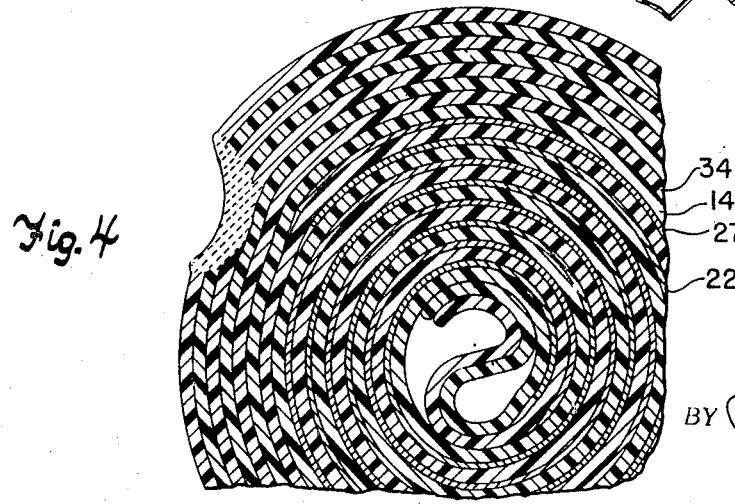
FIG. 4 is a fragmentary end view in cross section of a capacitor made with the process of the invention utilizing the apparatus of FIG. 1.

FIG. 4 is an end view in section showing a capacitor made in accordance with the invention on the apparatus shown in FIG. 1 and shows the layers being held together by melted dielectric at 60.

I claim:

1. A method of forming a plurality of identical capacitors from a supply of metallized dielectric strip wherein the strip has a plurality of equal metallized areas on each of its sides arranged in spaced overlapping relationship along its length, said dielectric strip having a plurality of equal completely cleared elongated areas along its length separating said plurality of equal metallized areas, the method comprising: winding one of said plurality of metallized areas and a portion of the cleared areas of the dielectric strip adjacent both ends of the metallized area into a capacitor in which said cleared areas comprise a plurality of outer protective wraps; simultaneously cutting said metallized dielectric strip in the cleared area between an already wound metallized area and a succeeding metallized area attached to the supply and heat sealing the cut end of the dielectric strip to the capacitor convolutions underlying it; and repeating said steps of winding and cutting and sealing.

2. The method of claim 1 wherein a companion strip of plain dielectric is wound together with said metallized dielectric strip, said metallized dielectric strip being cut during said cutting and heat sealing step intermediate the ends of the cleared area so that a cleared portion remains attached to the supply of metallized dielectric so as to provide an insulating core for the succeeding capacitor to be wound.

3. The method of claim 1 wherein said metallized dielectric strip is transversely folded at approximately the center of a metallized area and then wound about an axis parallel to the fold.

4. The method of claim 1 wherein the metallized areas on each side of the strip extend to only one edge of the strip and are spaced from the opposite edge by a narrow demetallized margin portion which overlies a metallized area on the opposite side of the strip.

5. The method of claim 2 wherein the metallized areas on each side of the metallized strip extend to only one edge of the strip and are spaced from the opposite edge by a narrow demetallized margin portion which overlies a metallized area on the opposite side of the strip.

6. The method of claim 5 wherein the companion strip of plain dielectric is narrower than the metallized dielectric strip and is wound centrally thereof.

7. The method of claim 2 and further including the step of sensing the ability of the clear areas of the metallized dielectric strip to transmit light and controlling the winding and cutting and sealing steps, in response thereto.

* * * * *